Nov. 16, 1926.
J. F. BOWERMAN
1,606,921
BATTERY TESTING DEVICE
Filed Jan. 15, 1926
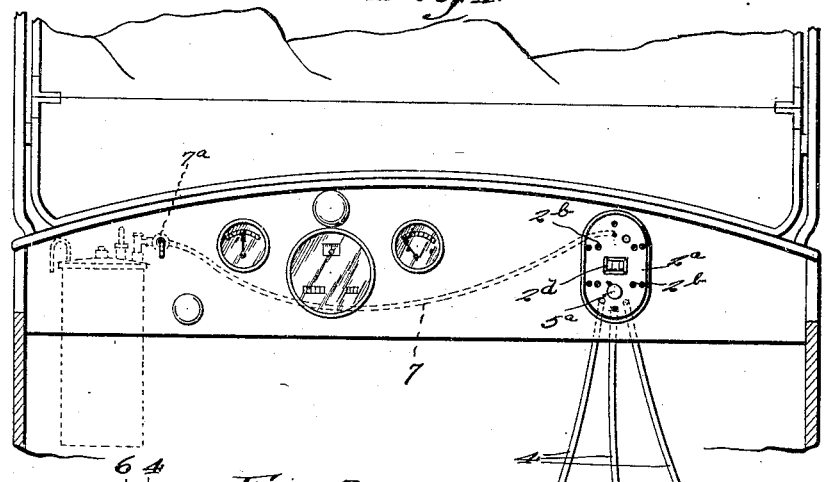
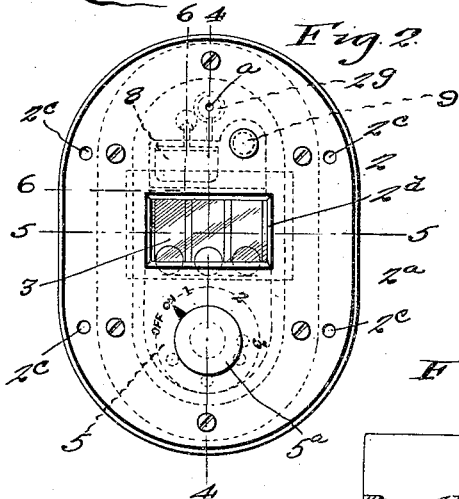
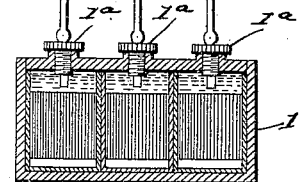
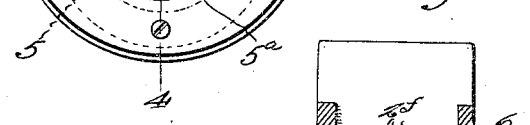
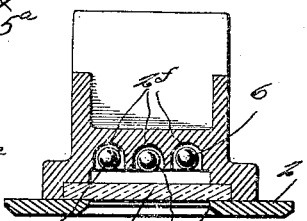
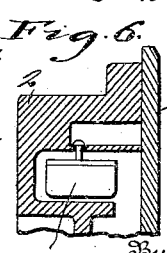
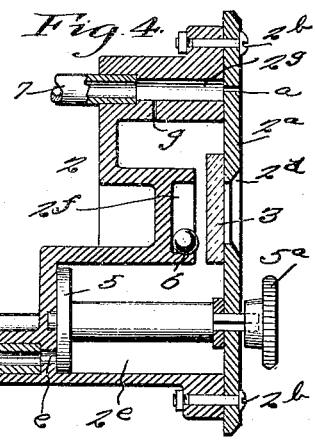
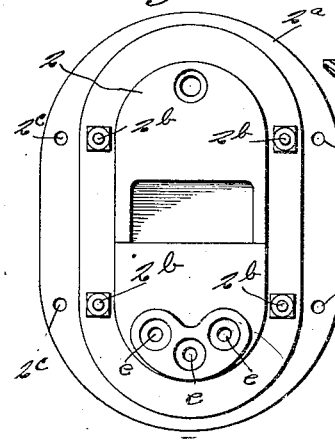
Inventor
James F. Bowerman
Attorney Patented Nov. 16, 1926.

1,606,921

UNITED STATES PATENT OFFICE.

JAMES F. BOWERMAN, OF JACKSON, MICHIGAN.

BATTERY-TESTING DEVICE.

Application filed January 15, 1926. Serial No. 81,434.

My present invention relates to improvements in specific gravity testing devices and is designed more particularly for testing the condition of the cells of storage or secondary batteries, the said invention being in the nature of a modification of that described and claimed in an application filed by me in the United States Patent Office on the 22nd day of July, 1925, Serial Number 45,397.

One of the objects of the present invention is to provide a testing device by which may be more readily observed than those of which I am aware wherein it is necessary to note relatively minute graduation marks on a small hydrometer stem.

Another object is to provide an instrument which will be free from the sticking tendency of the customary hydrometers, that is, the resistance encountered by contact of the hydrometer with the walls of the testing chamber requiring the operator to estimate on the difference between the rise and fall of the hydrometer for determining the condition of the electrolyte.

Another object is to provide a testing device by which the general condition of all three cells as to amount of electrolyte and charge may be quickly ascertained, and in case of need the cells may be individually tested to ascertain which cell is deficient.

A further object is to provide a construction whereby additional water may be readily supplied when necessary.

With these and other objects in view, the invention includes the novel features of construction and arrangement and combination of parts hereinafter described and particularly defined by the appended claims.

What I at present consider as the preferred embodiment of my invention is illustrated in the accompanying drawings, in which:—

Figure 1 is a view, largely of a conventional nature, showing a portion of an automobile with my invention applied thereto.

Fig. 2 is an enlarged front elevation of the testing chamber.

Fig. 3 is a rear elevation of the same.

Fig. 4 is a central transverse vertical section on line 4—4 of Fig. 2.

Fig. 5 is a horizontal section on line 5—5 of Fig. 2, and

Fig. 6 is a partial section on line 6—6 of Fig. 2.

Referring by reference characters to this drawing, the numeral 1 designates the battery, which is shown as of the ordinary three cell type having the usual closure plugs $1^a$, one for each cell. 2 indicates a testing device which may be made of any suitable material, but preferably of bakelite, which is preferably shaped so that the various compartments therein hereinafter more fully described, are open at one side (the front) and closed by a closure plate $2^a$, secured thereto by bolts or analogous fastening means indicated at $2^b$.

The cover plate is preferably projected sufficiently beyond the body portion 2 to permit it to be secured to the panel board of the motor vehicle by means of bolts passing through the holes $2^c$, it being understood that the panel board would be provided with an opening of a size and shape to receive the said body portion. The cover plate or member $2^a$ is preferably formed of bakelite covered or finished material, so as to present an attractive appearance, and is provided with a sight opening $2^d$ covered by a glass plate or transparent panel member 3, through which the condition of the electrolyte may be observed, as hereinafter described. The lower portion of the testing device is formed in the shape of a valve chamber $2^e$, the rear wall of which is provided with three ports $e$, these ports leading into enlarged tubular extensions, as clearly shown in Fig. 4, which extensions are adapted to be connected to the respective individual cells of the battery by pipe connections 4 which may be in the shape of rubber tubes having their lower ends connected to passages in the closure plugs $1^a$ and their upper ends connected to the tubular extensions of the body member 2. Within the chamber $2^e$ is a rotary valve 5 having four ports which in one position of the valve are adapted to place all three tubes in connection with the testing device, said valve being adapted also to be moved to a position to cut off all the tubes and to intermediate positions designed to put the three tubes into individual connection with the testing device, such positions being indicated respectively by the word "on" when three tubes are connected, the word "off" when all three are cut off, and the numerals "1, 2 and 3", indicating the respective cells of the battery. The valve has a stem projecting through the cover member which is provided with an operating knob 5ª which may have an indicating pointer or arrow mark to cooperate with the dial indications on the cover plate. Immediately above the valve chamber and communicating therewith is what I term a float receiving space which is provided with three vertically disposed guide channels 2ᶠ in which are located float members 6 preferably in the shape of balls for the reason hereinafter described, which balls are made of different specific gravity. One ball is made of such specific gravity that it will float when the battery is only partially charged, or in other words, when corresponding to the low reading on the ordinary hydrometer. A second ball is of such specific gravity that it will float on the surface of the electrolyte when the latter is in approximately the medium charged condition, while the third ball will only float when the battery is fully charged. These examples are given by way of illustration, but of course the specific gravity of the balls may be such as to give any desired indication or reading. Given an arrangement such as described, it will be readily observed that if the electrolyte is drawn up into the testing chamber so as to be above the ball guides, if no balls float or only one ball floats, the operator knows that the battery needs charging. If two balls float, he knows that he has a medium charge and can run for a longer period without charging, if desired, while if three balls float, he knows that the battery is fully charged and can act accordingly to prevent over-charging. The balls are readily observable through the observation opening and can be seen at a glance, even in a dim light, thereby avoiding the objections due to the fine reading on the ordinary hydrometers.

By the use of ball shaped members, no resistance to rise is encountered, as if the ball contacts with the wall of the guides, it will roll freely thereon and give a true indication of the condition of the electrolyte. Of course, if desired, the balls may be differently colored so that the colors, in addition to the number of the balls, would serve as an indication.

For ordinary purposes and when the battery is known to be in good condition, to wit: the three cells being substantially uniform, which in the majority of instances is the case, testing is accomplished by turning the valve so that all three ports are in register with the testing chamber. If electrolyte is drawn up into the testing chamber, so that one or more of the balls rise, the operator knows that all three cells have sufficient electrolyte and can read the condition as to charge, as above described. If no electrolyte appears in the testing chamber, then the operator knows that one or more of the cells is lacking in the necessary quantity of electrolyte, as the dropping of the electrolyte below the level of any one of the tube connections shown in Fig. 1 will cause air to be admitted, whereby the suction relied upon to draw the electrolyte up into the testing chamber will be ineffective. The operator may then proceed, through the proper rotation of the valve, to test up each cell individually. For exerting the necessary suction to thus draw the electrolyte up into the testing chamber, I provide the body 2 with a passage 2ᵍ designed to be connected by a pipe 7 with a suction producing part of the automobile, such, for example, as the intake manifold, or the vacuum tank, as indicated in dotted lines in Fig. 1. The cover plate has a small port or passage a normally open and admitting air to the passage 2ᵍ, so that under ordinary conditions the suction is ineffective, which port may be closed by merely applying the finger thereto. The pipe 7 may be provided with a valve 7ª which may be turned to cut off suction when the testing device is not to be used, or open to throw on the suction for testing purposes, but this valve may be omitted or left open, as the ports a and g are so small that the amount of air admitted through port a will not interfere with the proper functioning of the engine. It will be understood that the relative port areas are such that when port a is open no suction will be produced in the testing chamber, which may be accomplished by making a restricted passage leading to, or in, pipe 7 of area equal to port a, or as shown, by making ports g and a of substantially equal area.

Beneath port g is a float valve 8 which is designed to be raised by the electrolyte and thereby close the said port g to prevent electrolyte from being drawn into the pipe 7.

If when the suction is admitted to the testing chamber no electrolyte appears, it is evidence, as above stated, that the battery needs additional water. To enable this to be supplied, I provide an opening 9 in the cover plate communicating with a passage in the body 2 which leads to the suction chamber at one side of passage 2ᵍ and independent thereof, which opening 9 is normally closed by suitable means, such, for example, as a plug. When water is needed, this may be easily supplied through the opening 9 on removal of the plug, either by the use of a filling device, such as the ordinary rubber bulb and nozzle, or it may be done by providing a water bottle with a rubber tube having one end inserted therein below the water level and the other into the opening 9. With the bottle elevated above the opening 9 and suction turned on, the flow of water will be started to secure a siphon action which will continue until sufficient water has entered the testing chamber, from which, of course, it will flow down through the proper tube into the cell needing the additional water supply.

Having thus described my invention, what I claim is:—

1. A specific gravity testing device comprising a single chamber having a transparent wall and a plurality of members movably confined in substantially horizontal alignment in proximity to said transparent wall, said members being of varying specific gravity.

2. A specific gravity testing device comprising a single chamber having a transparent wall and a plurality of members movably confined in substantially horizontal alignment in proximity to said transparent wall, said members being of varying specific gravity, and means for supplying liquid to be tested to said chamber.

3. The device of claim 1, in which the movable members are arranged in individual guide chambers.

4. In apparatus for testing the electrolyte of storage batteries, a testing chamber having a transparent wall, a plurality of indicating members of different specific gravity movably guided in proximity to said wall, means connected to said testing chamber for exhausting air therefrom, pipe connections from said testing chamber to the battery cells, valve means controlling said pipe connections, and a port in the wall of the chamber for placing said port in communication with the atmosphere, said port being adapted to be closed by the finger of the operator.

5. In apparatus for testing the electrolyte of storage batteries of motor vehicles, a receptacle having a testing chamber provided with a transparent wall, specific gravity indicating means therein adjacent said wall, means for connecting said testing chamber with a suction producing part of a motor vehicle, pipe connections from said chamber to the cells of the battery, valve means for closing said pipe connections, a passage for admitting filling water to said chamber, and means normally closing said passage.

6. Apparatus for testing the electrolyte of storage batteries comprising a casing having a lower valve chamber, an upper suction chamber, and an intermediate float chamber having upper and lower horizontal ledges, a closure member for said casing having a transparent portion spaced from said ledges, a plurality of specific gravity indicating floats confined between said ledges, pipe connections from the valve chambers to the battery cells, a valve in said valve chamber controlling said connections, and means for exerting suction on said suction chamber.

7. Apparatus for testing the electrolyte of storage batteries comprising a casing having a lower valve chamber, an upper suction chamber, and an intermediate float chamber having upper and lower horizontal ledges, a closure member for said casing having a transparent portion spaced from said ledges, a plurality of specific gravity indicating floats confined between said ledges, pipe connections from the valve chamber to the battery cells, a valve in said valve chamber controlling said connections, and means for exerting suction on said suction chamber, and a float actuated valve in said suction chamber for cutting off suction on rise of electrolyte therein.

In testimony whereof I affix my signature.

JAMES F. BOWERMAN.